(12) United States Patent
Oota et al.

(10) Patent No.: US 7,853,104 B2
(45) Date of Patent: Dec. 14, 2010

(54) BIDIRECTIONAL OPTICAL MODULE AND OPTICAL TIME DOMAIN REFLECTOMETER

(75) Inventors: Katsushi Oota, Musashino (JP); Haruo Shibuya, Musashino (JP); Yasuaki Tamura, Saitama (JP); Shunji Sakai, Saitama (JP)

(73) Assignees: Yokogawa Electric Corporation, Tokyo (JP); Optohub Co., Ltd, Saitama (JP)

( * ) Notice: Subject to any disclaimer, the term of this patent is extended or adjusted under 35 U.S.C. 154(b) by 4 days.

(21) Appl. No.: 12/348,686

(22) Filed: Jan. 5, 2009

(65) Prior Publication Data

US 2010/0172614 A1 Jul. 8, 2010

(51) Int. Cl.
 *G02B 6/42* (2006.01)
(52) U.S. Cl. ............................. 385/47; 385/48; 385/11; 385/27
(58) Field of Classification Search ....................... None
 See application file for complete search history.

(56) References Cited

U.S. PATENT DOCUMENTS 6,480,331 B1 * 11/2002 Cao ............................. 359/484
6,532,321 B1 * 3/2003 Zhang et al. .................. 385/27
2002/0018286 A1 * 2/2002 Lee et al. ................. 359/337.1

FOREIGN PATENT DOCUMENTS

JP 2004-145136 A 5/2004

* cited by examiner

*Primary Examiner*—Charlie Peng
*Assistant Examiner*—Eric Wong
(74) *Attorney, Agent, or Firm*—Sughrue Mion, PLLC (57) ABSTRACT

A bidirectional optical module according to the present invention emits light to an optical fiber and allows returning light from the optical fiber to enter and includes a plurality of light emitting elements that emit light to enter the optical fiber, a light receiving element that receives light having exited the optical fiber, and a non-reciprocal unit for making an optical path in a forward direction from the light emitting element to the optical fiber and an optical path in a backward direction from the optical fiber to the light emitting element different. Then, polarization planes of light incident on the optical fiber after being emitted from the plurality of light emitting elements are mutually orthogonal, and the non-reciprocal unit emits returning light of light emitted from the plurality of light emitting elements from the optical fiber toward the light receiving element to one light receiving element.

11 Claims, 7 Drawing Sheets

BIDIRECTIONAL OPTICAL MODULE AND OPTICAL TIME DOMAIN REFLECTOMETER

CROSS REFERENCES TO RELATED APPLICATIONS

The present invention contains subject matter related to Japanese Patent Application JP 2007-275590 filed in the Japan Patent Office on Oct. 23, 2007, the entire contents of which being incorporated herein by reference.

BACKGROUND OF THE INVENTION

1. Field of the Invention

The present invention relates to a bidirectional optical module and more specifically, it relates to a bidirectional optical module to be included in an OTDR used in applications such as measurement of a fracture in an optical fiber communication network.

2. Description of the Related Art

A measuring device such as an optical fiber sensor, which executes measurement by using light in an optical communication system or the like, includes a light source that emits light and a light receiving unit that receives the light. A measuring device utilized in maintenance, management and the like of an optical communication system includes a light source that emits measurement light to be used for purposes of measurement to a measurement target optical fiber and a light receiving unit that receives light transmitted through the measurement target optical fiber.

For instance, an OTDR (Optical Time Domain Reflectometer) may be utilized in the installation, maintenance and the like of an optical fiber in order to monitor the state of the optical fiber through which light signals are transmitted for data communication in an optical communication system. An OTDR executes measurement to determine the conditions of the measurement target optical fiber, e.g., whether or not a disconnection has occurred at the measurement target optical fiber, the extent of loss or the like, by repeatedly inputting pulse light to the measurement target optical fiber and measuring the level of light reflected from the measurement target optical fiber, the level of light scattered to the rear and the length of time over which the light is received.

An OTDR includes a bidirectional optical module, a BIDI (bidirectional) module or the like, having a transmission unit and a reception unit housed in a single case. The advent of the FTTH (fiber to the home) technologies in recent years has resulted in these modules being offered at more affordable prices and thus, they have come to be used in a wide range of applications including other types of measuring devices and optical communication systems as well as OTDRs.

Figure 4:
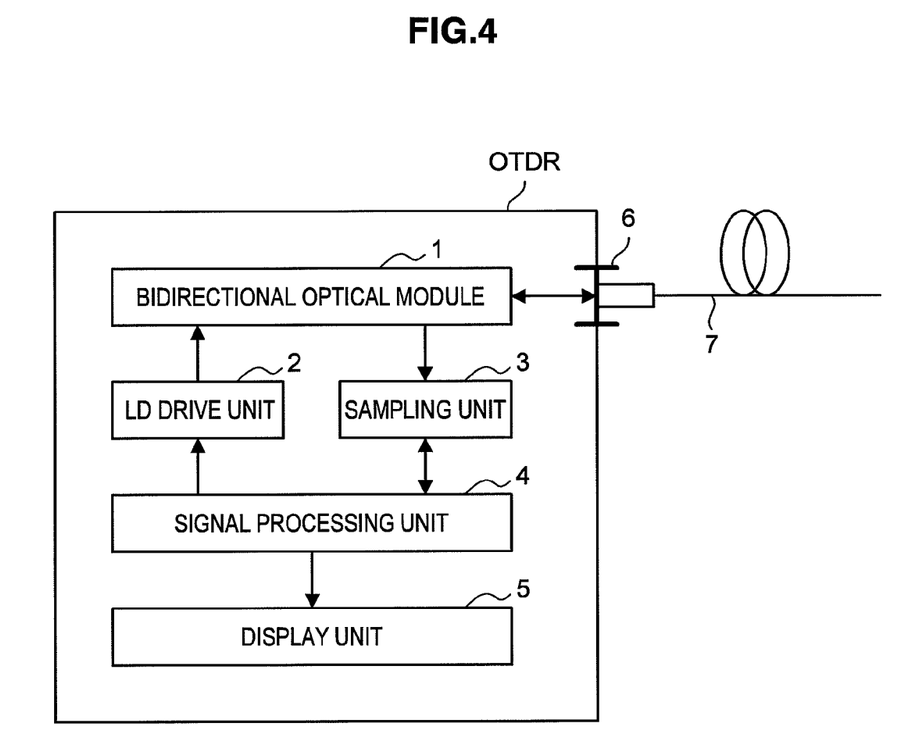
FIG. 4 is a block diagram showing the configuration of an OTDR.

For example, an OTDR equipped with a bidirectional optical module includes, as shown in FIG. 4, a bidirectional optical module 1, an LD drive unit 2, a sampling unit 3, a signal processing unit 4, and a display unit 5.

The bidirectional optical module 1 outputs pulse light to a measurement target optical fiber 7 via a measurement connector 6 and receives the light returning from the measurement target optical fiber 7. The LD drive unit 2 drives a light source disposed within the bidirectional optical module 1. The sampling unit 3 is a functional unit that converts an electrical signal (photocurrent) from a light receiving unit within the bidirectional optical module 1 to a voltage and samples the voltage resulting from the conversion. The signal processing unit 4 is a functional unit that engages the bidirectional optical module 1 to output pulse light via the LD drive unit 2 and engages the sampling unit 3 in a sampling operation. In addition, the signal processing unit 4 executes arithmetic operation processing on the electrical signal sampled by the sampling unit 3. The display unit 5 is a functional unit that indicates the signal processing results and may be constituted with, for instance, a display device.

Figure 5:
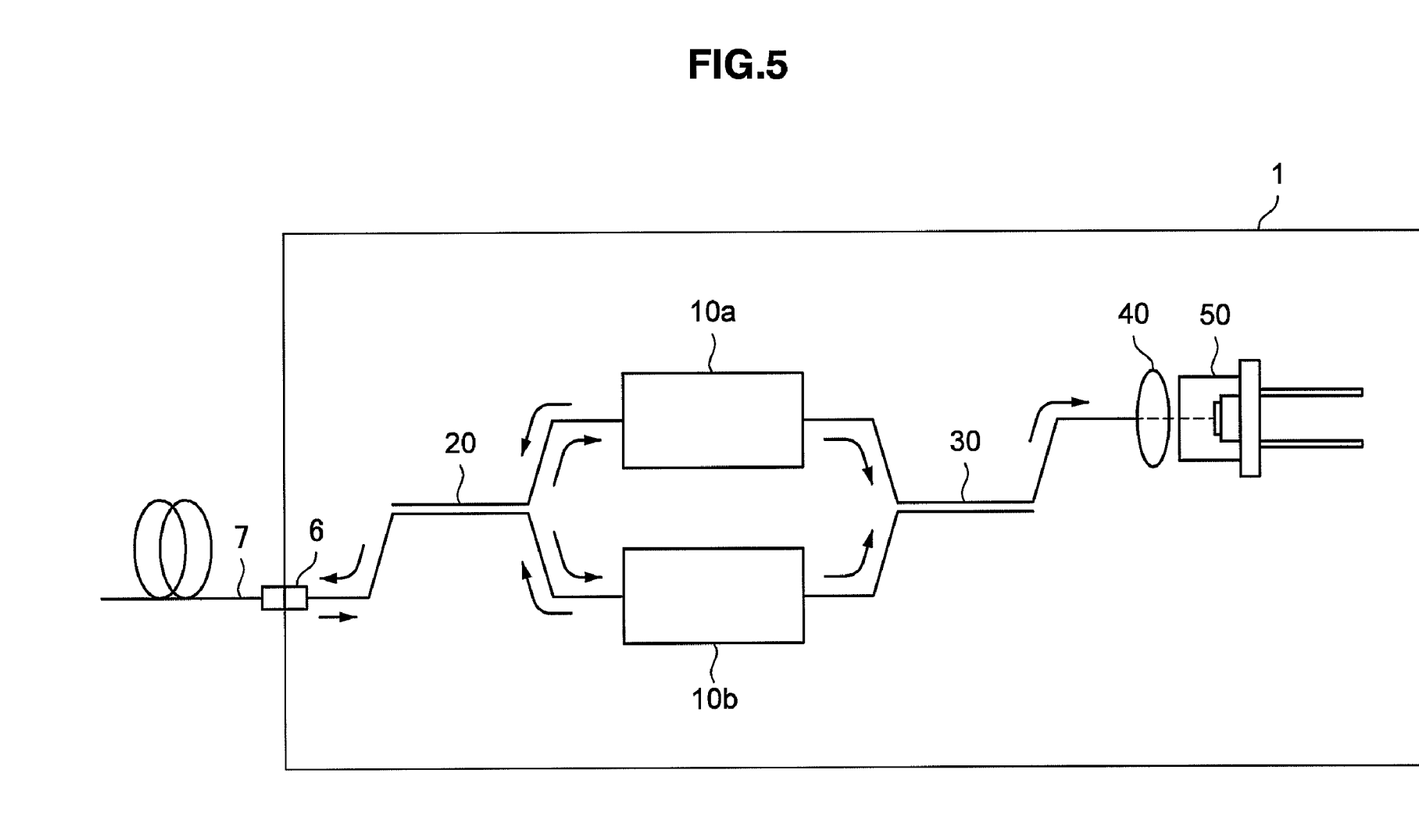
FIG. 5 is an explanatory diagram showing the configuration of a bidirectional optical module in the related art.

The conventional bidirectional optical module 1 includes, for example, as shown in FIG. 5, optical separators 10a and 10b, multiplexing/demultiplexing couplers 20 and 30, a lens 40, and a light receiving element 50 (for example, Japanese Patent Application Laid-Open No. 2004-145136).

Figure 6:
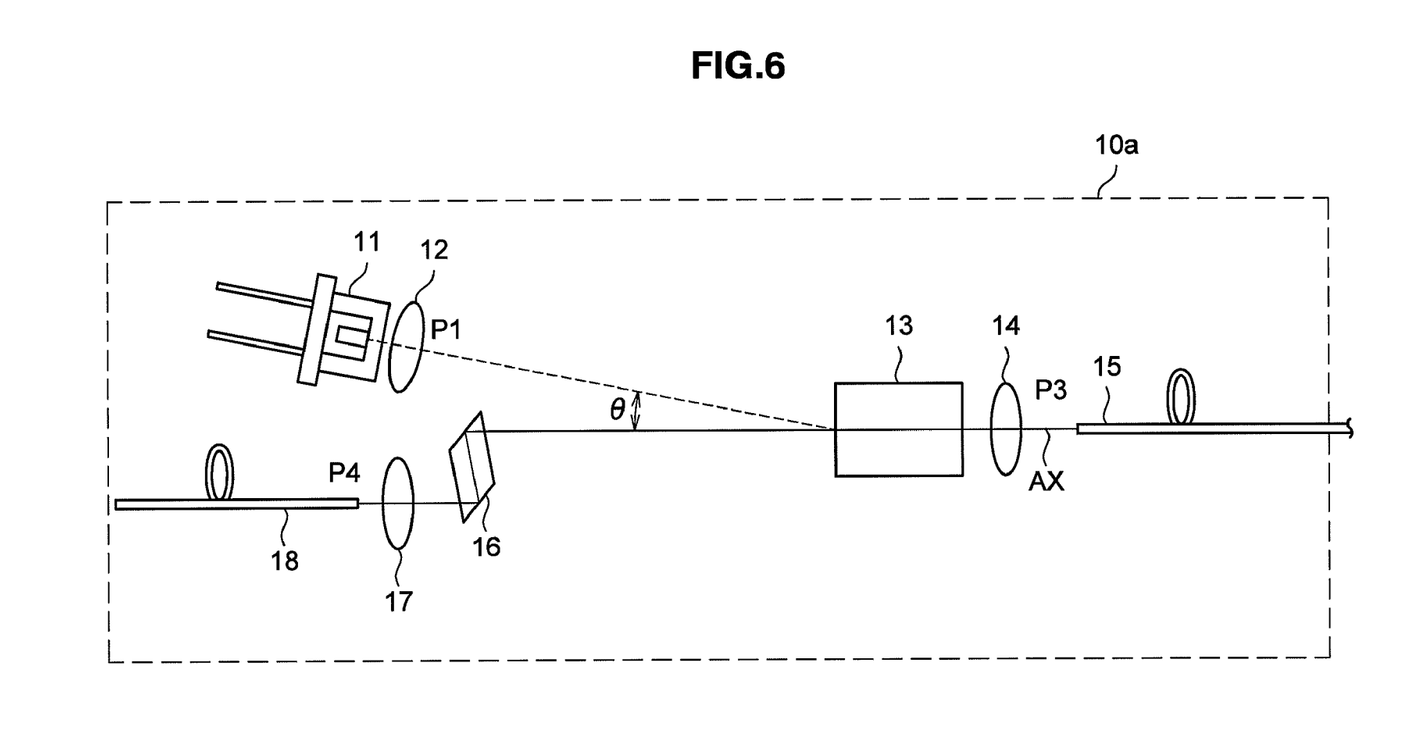
FIG. 6 is an explanatory diagram showing the configuration of an optical separator in the related art.

The optical separator 10a includes, for example, as shown in FIG. 6, a semiconductor laser 11, a non-reciprocal unit 13, optical fibers 15 and 18, a refractive prism 16, and lenses 12, 14, and 17. Light emitted from the semiconductor laser 11 of the optical separator 10a is made parallel by the lens 12 and then, the light having a polarization plane in a predetermined direction with respect to an incidence plane when entering the non-reciprocal unit 13 enters the non-reciprocal unit 13 at a predetermined angle θ. After entering the non-reciprocal unit 13, the light passes through the non-reciprocal unit 13 before being coupled to the optical fiber 15 connected to the multiplexing/demultiplexing coupler 20 shown in FIG. 5 via the lens 14. The optical separator 10b is configured in the same manner as the optical separator 10a.

The optical separators 10a and 10b emit lights of mutually different wavelengths $\lambda_1$ and $\lambda_2$ from the semiconductor laser 11. Lights of these wavelengths $\lambda_1$ and $\lambda_2$ enter the multiplexing/demultiplexing coupler 20 via the optical fiber 15 of the optical separators 10a and 10b. The light multiplexed by the multiplexing/demultiplexing coupler 20 is output to the measurement target optical fiber 7 via the measurement connector 6 before being reflected by a fracture (or a connecting point) in the measurement target optical fiber 7. The reflected light enters the multiplexing/demultiplexing coupler 20 via the measurement connector 6 as a returning light. The multiplexing/demultiplexing coupler 20 demultiplexes the returning light from the measurement target optical fiber 7 before a light of the wavelength $\lambda_1$ being output to the optical separator 10a and a light of the wavelength $\lambda_2$ to the optical separator 10b.

The demultiplexed returning light of the wavelength $\lambda_1$ passes through the non-reciprocal part 13 via the lens 14 in the optical separator 10a before entering the refractive prism 16. After entering the refractive prism 16, the light travels through the refractive prism 16 while being refracted before being coupled to the optical fiber 18 connected to the multiplexing/demultiplexing coupler 30 via the lens 17. Similarly, the returning light of the wavelength $\lambda_2$ demultiplexed by the multiplexing/demultiplexing coupler 20 passes through the optical separator 10b before being coupled to the optical fiber 18 connected to the multiplexing/demultiplexing coupler 30. Then, the lights of the wavelengths $\lambda_1$ and $\lambda_2$ incident on the multiplexing/demultiplexing coupler 30 from the optical fiber 18 of the optical separators 10a and 10b are multiplexed by the multiplexing/demultiplexing coupler 30 and then condensed before being coupled to the light receiving element 50.

By using the OTDR described above, the position of a fracture of the measurement target optical fiber 7 can be detected based on a time between when an emitted pulsed light is generated in the semiconductor laser 11 and when a returning light reflected by a fracture reaches the light receiving element 50. The bidirectional optical module 1 for OTDR configured as shown in FIG. 5 has a circulator function and can separate light with a low loss, providing high optical power and high sensitivity.

Patent reference literature 1: Japanese Laid Open Patent Publication No. 2004-145136

SUMMARY OF THE INVENTION

However, as shown in FIG. 6, only one semiconductor laser 11 is provided in one optical separator 10a. Thus, generally in an OTDR in which multi-wavelength measurement becomes necessary, as shown in FIG. 5, it is necessary to couple a plurality of the optical separators 10a and 10b to the multiplexing/demultiplexing couplers 20 and 30. That is, after a returning light from the measurement target optical fiber 7 being once wavelength-divided by the multiplexing/demultiplexing coupler 20, it is necessary to pass the demultiplexed lights through the wavelength specific optical separators 10a and 10b before the lights being multiplexed again by the multiplexing/demultiplexing coupler 30.

If the configuration of the bidirectional optical module 1 becomes more complex, as described above, the number of components thereof will increase. Thus, manufacturing costs go up and coupling losses of the components increase, affecting the bidirectional optical module 1 adversely. Moreover, because a melting type optical fiber coupler is generally used as the multiplexing/demultiplexing couplers 20 and 30, troublesome work such as fusing work of optical fiber and accommodation of remaining-length optical fiber arises. Thus, there is a problem that working man hours in the manufacturing process increase and miniaturization of the bidirectional optical module 1 becomes more difficult. Further, when the bidirectional optical module 1 for OTDR of three waves or more is configured, there is a problem that the configuration of the multiplexing/demultiplexing couplers 20 and 30 becomes very complicated and manufacturing costs go up.

Thus, the present invention addresses the problems described above and provides a new and improved bidirectional optical module and an OTDR that has high optical power and high sensitivity and can be miniaturized.

According to an embodiment of the present invention, there is provided a bidirectional optical module that emits light to an optical fiber and on which returning light from the optical fiber is incident. The bidirectional optical module includes a plurality of light emitting elements that emit light to enter the optical fiber, a light receiving element that receives light having exited the optical fiber, and a non-reciprocal unit for making an optical path in a forward direction from the light emitting element to the optical fiber and an optical path in a backward direction from the optical fiber to the light emitting element different. Then, polarization planes of light incident on the optical fiber after being emitted from the plurality of light emitting elements are mutually orthogonal, and the non-reciprocal unit emits returning light of light emitted from the plurality of light emitting elements from the optical fiber toward the light receiving element to one light receiving element.

According to the present invention, polarization planes of light after being emitted from the plurality of light emitting elements are mutually orthogonal. Light having such polarization planes after being emitted from the light emitting elements enters the optical fiber via the non-reciprocal unit. Then, returning light from the optical fiber enters one light receiving element via the non-reciprocal unit. By orthogonalizing directions of the polarization planes of lights emitted from the plurality of light emitting elements in this manner, the optical path in the forward direction and that in the backward direction can be made different in the non-reciprocal unit so that a bidirectional optical module can be constructed with a smaller number of components.

Here, light emitted from the plurality of light emitting elements is emitted from a first port or a second port. At this point, light emitted from the first port is incident with an inclination of a predetermined angle in a positive direction with respect to an optical axis of the non-reciprocal unit, and light emitted from the second port is incident with the inclination of the predetermined angle in a negative direction with respect to the optical axis of the non-reciprocal unit. Accordingly, spacing between the light emitting element and light receiving element in a perpendicular direction with respect to the optical axis of the non-reciprocal unit can be increased.

The polarization plane of light emitted from the first port and that of light emitted from the second port are constructed to be orthogonal to each other. Light emitted from the first port is emitted from at least the two light emitting elements and directions of the polarization planes of light emitted from at least the two light emitting elements are identical. Also, for light emitted from the second port, the light may be made to be emitted from at least the two light emitting elements to make directions of the polarization planes of light emitted from at least the two light emitting elements identical.

Here, the non-reciprocal unit may include a Faraday rotator and wedge-shaped double refraction optical elements placed reversed on both sides of the Faraday rotator. The Faraday rotator functions to rotate the polarization plane of light entering the non-reciprocal unit by a predetermined angle. The double refraction optical element functions to refract light entering the double refraction optical element by forming an inclined plane in a wedge shape.

A double refraction optical element for refracting the optical path between the light emitting element and the non-reciprocal unit may be provided. Accordingly, the distance between the light emitting element and the non-reciprocal unit can be shortened to further reduce the size of the bidirectional optical module.

Further, a multiplexing/demultiplexing filter for multiplexing lights emitted from the plurality of light emitting elements may be provided between the light emitting elements and the double refraction optical element. That is, lights emitted from two or more light emitting elements are multiplexed by the multiplexing/demultiplexing filter so that the multiplexed light can be emitted from one port. Accordingly, light of three or more wavelengths can be caused to enter the optical fiber by a simple constitution.

According to another embodiment of the present invention, there is provided an optical time domain reflectometer that tests loss characteristics of an optical fiber. The optical time domain reflectometer includes a bidirectional optical module that emits light toward the optical fiber and receives light returning from the optical fiber, a bidirectional optical module drive unit that drives the bidirectional optical module so as to emit light with predetermined timing, an electrical signal conversion unit that converts light having entered the bidirectional optical module to an electrical signal, and a signal processing unit that determines through calculation the loss characteristics of the optical fiber based on the electrical signal resulting from the conversion executed by the electrical signal conversion unit. Then, the bidirectional optical module includes a plurality of light emitting elements that emit light to enter the optical fiber, a light receiving element that receives light having exited the optical fiber, and a non-reciprocal unit for making an optical path in a forward direction from the light emitting element to the optical fiber and an optical path in a backward direction from the optical fiber to the light emitting element different. At this point, polarization planes of light incident on the optical fiber after being emitted from the plurality of light emitting elements are mutually orthogonal, and the non-reciprocal unit emits returning light of light emitted from the plurality of light emitting elements from the optical fiber toward the light receiving element to one light receiving element.

According to the present invention described above, a bidirectional optical module that has high optical power and high sensitivity and can be miniaturized and an OTDR can be provided.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

Figure 1:
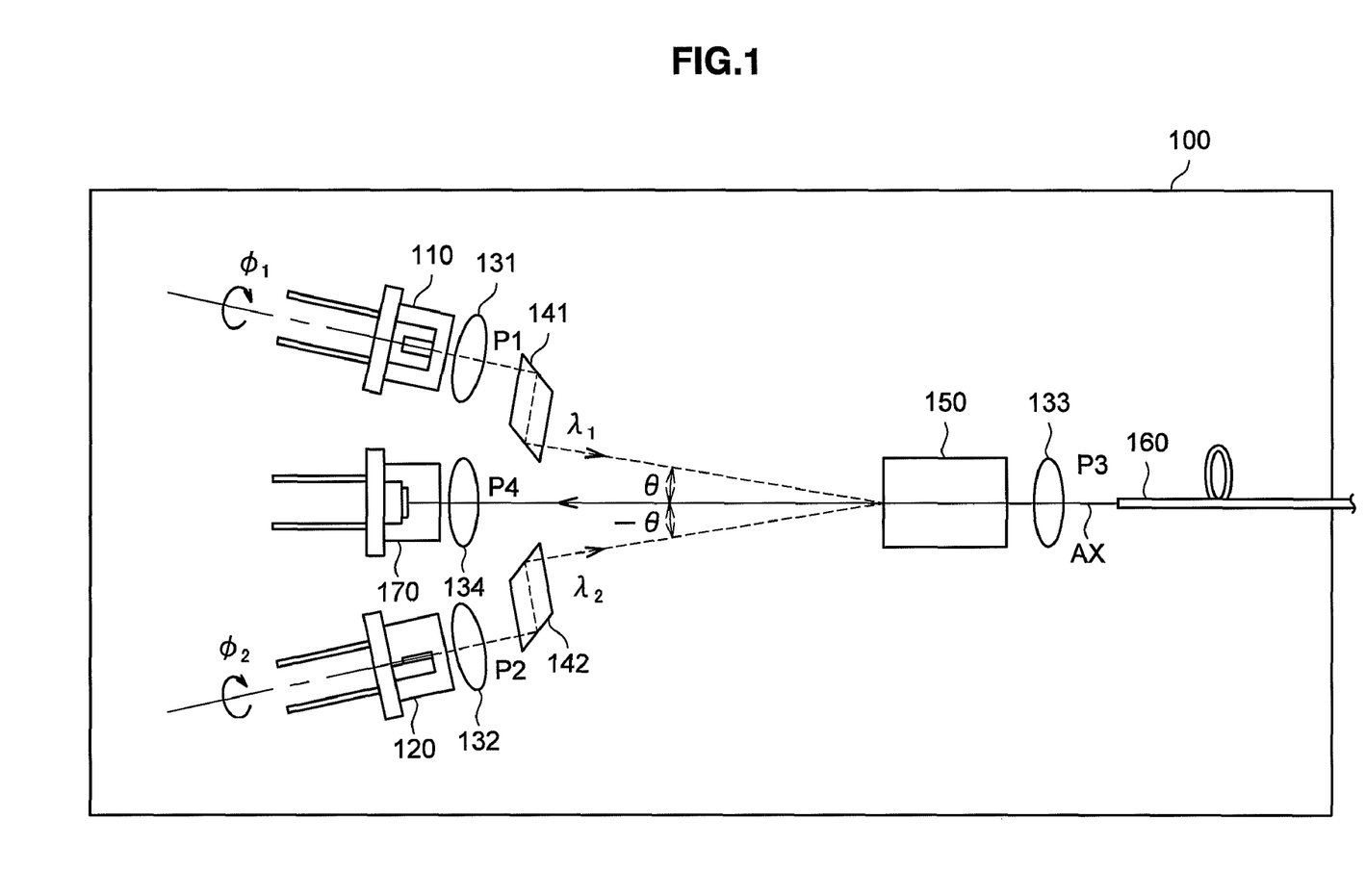
FIG. 1 is an explanatory diagram showing the configuration of a bidirectional optical module according to a first embodiment of the present invention.

First, the configuration of a bidirectional optical module 100 according to the first embodiment of the present invention will be described based on FIG. 1. FIG. 1 is an explanatory diagram showing the configuration of the bidirectional optical module 100 according to the present embodiment.

<Configuration of Bidirectional Optical Module>

The bidirectional optical module 100 according to the present embodiment includes, as shown in FIG. 1, light emitting elements 110 and 120 to emit light, lenses 131 and 132 to make light parallel, lenses 133 and 134 to condense light, refractive prisms 141 and 142, a non-reciprocal unit 150 to allow light to pass only in one direction, an optical fiber 160, and a light receiving element 170 to detect light. The bidirectional optical module 100 according to the present embodiment has the light emitting element 110 disposed in a first port P1, the light emitting element 120 disposed in a second port P2, the optical fiber 160 disposed in a third port P3, and the light receiving element 170 disposed in a fourth port P4. In the bidirectional optical module 100 described above, light emitted from the first port P1 or second port P2 is emitted from the third port P3 via the non-reciprocal unit 150. Returning light entering from the third port P3 is emitted from the fourth port P4 via the non-reciprocal unit 150.

The light emitting elements 110 and 120 are elements that receive light to enter the optical fiber 160 and, for example, a laser diode can be used. The light emitting elements 110 and 120 have a coaxial structure centering around an optical axis of emitted light from each of the light emitting elements 110 and 120 and can be inserted into a cabinet or the like of the bidirectional optical module 100 by freely being rotated around the optical axis. Therefore, the light emitting elements 110 and 120 can be inserted after the direction of the polarization plane of linearly polarized waves of emitted light from the light emitting elements 110 and 120 being rotated by predetermined rotation angles $\phi_1$ and $\phi_2$. In the present embodiment, the light emitting element 110 is provided so that linearly polarized light having the polarization plane perpendicular to the incidence plane when entering the non-reciprocal unit 150, that is, an s wave is emitted. The light emitting element 120 is provided so that linearly polarized light having the polarization plane horizontal to the incidence plane when entering the non-reciprocal unit 150, that is, a p wave is emitted.

The lenses 131 and 132 are lenses to make light parallel and, for example, a collimator lens can be used. The lens 131 makes light emitted from the light emitting element 110 parallel and the lens 132 makes light emitted from the light emitting element 120 parallel.

The lenses 133 and 134 are lenses to condense light and, for example, a planoconvex lens can be used. The lens 133 condenses a light after passing through the non-reciprocal unit 150 to couple the light to the optical fiber 160. The lens 134 condenses a returning light from the optical fiber 160 after passing through the non-reciprocal unit 150 to couple the light to the light receiving element 170.

The refractive prisms 141 and 142 are optical elements to refract the optical path and, for example, a parallelogram prism or total reflection mirror can be used. The refractive prisms 141 and 142 are elements provided to miniaturize the bidirectional optical module 100 and allow spacing to the light receiving element 170 described later to increase and bring the light emitting element 110 and the non-reciprocal unit 150 closer by refracting light emitted from the light emitting elements 110 or 120.

The non-reciprocal unit 150 is a polarization independent optical isolator having non-reciprocity in which effects received from substance are different depending on the propagation direction of light. The non-reciprocal unit 150 according to the present embodiment uses double refraction, spontaneous optical rotary power, and the Faraday effect. The double refraction is a phenomenon in which one of two components of light travels in a straight line and the direction in which the other component orthogonal thereto travels changes. The spontaneous optical rotary power is a property in which the polarization direction of light entering from one direction rotates. The Faraday effect is a phenomenon resulting from a property of magnetic material in which the polarization direction of light entering from one direction rotates and the polarization direction of light entering from the other direction is further rotated in the same direction without rotating back. The non-reciprocal part 150 according to the present embodiment acts in such a way that the optical path of light entering from the backward direction is switched depending on the state of polarization, while light entering from the forward direction is allowed to pass through with a low loss.

Figure 2A:
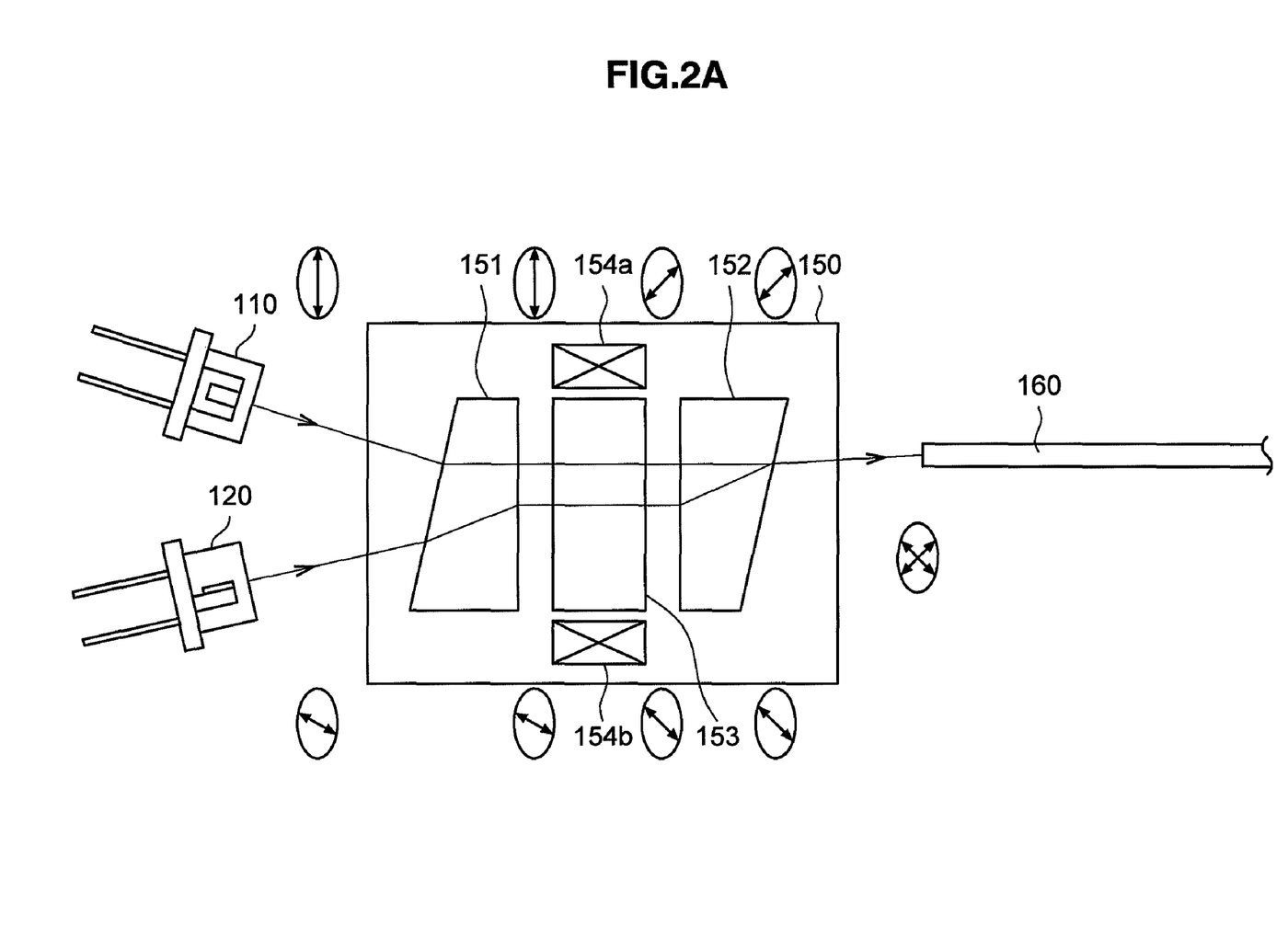
FIG. 2A is an explanatory diagram showing the configuration of a non-reciprocal unit according to the first embodiment and an optical path from a light emitting element to an optical fiber.

The non-reciprocal unit 150 according to the present embodiment includes, as shown in FIG. 2A, double refraction optical elements 151 and 152, a Faraday rotator 153, and permanent magnets 154a and 154b. The double refraction optical elements 151 and 152 are optical elements in a substantially wedge shape placed reversed and opposite to each other along the direction of an optical axis AX (see FIG. 1) side by side sandwiching the Faraday rotator 153 described later. The double refraction optical elements 151 and 152 have a property that the index of refraction changes depending on the polarization plane of the traveling light and, for example, a rutile crystal can be used. The double refraction optical elements 151 and 152 each have a surface on the side of the Faraday rotator 153 of two surfaces opposite to each other in the direction of the optical axis AX formed substantially perpendicular to the optical axis AX and the other surface formed to have an inclination of a predetermined angle (for example, 22.5°).

The Faraday rotator 153 is a element provided between the permanent magnets 154a and 154b placed in a direction perpendicular to the optical axis AX and magnetized in the same direction as the optical axis AX. The Faraday rotator 153 rotates the polarization plane of light traveling inside the Faraday rotator 153 around the optical axis AX by a predetermined angle, for example, 45°. At this point, the rotation direction of the polarization plane depends on the traveling direction of light. A garnet crystal, for example, can be used as the Faraday rotator 153.

The non-reciprocal unit 150 causes light incident on the non-reciprocal unit 150 to enter the optical fiber 160 connected to a measurement target optical fiber. On the other hand, when a returning light from the measurement target optical fiber is incident on the non-reciprocal unit 150, the non-reciprocal unit 150 outputs the returning light to the light receiving element 170. A detailed description of traveling of light inside the non-reciprocal unit 150 will be provided later.

The light receiving element 170 is an element to detect light and, for example, an avalanche photodiode (hereinafter, referred to as "APD") can be used. The APD is a light receiving element using an avalanche amplification effect and can also detect feeble light with high sensitivity. Thus, the APD (particularly, the APD with a small diameter) is appropriate as a light receiving element of an OTDR or the like that needs to detect feeble returning light with a high range resolution.

As shown in FIG. 1, the bidirectional optical module 100 has the light emitting elements 110 and 120 and the light receiving element 170 disposed on one side and the optical fiber 160 connected to the measurement target optical fiber 7 disposed on the other side sandwiching the non-reciprocal unit 150. The optical fiber 160 and the light receiving element 170 are disposed on the optical axis AX. Then, the light emitting element 110, the lens 131, and the refractive prism 141 are disposed so that light enters the non-reciprocal unit 150 at an angle of θ with respect to the optical axis AX. The light emitting element 120, the lens 132, and the refractive prism 142 are disposed so that light enters the non-reciprocal unit 150 at an angle of −θ with respect to the optical axis AX.

In the foregoing, the configuration of the bidirectional optical module 100 according to the present embodiment has been described. Next, functions of the bidirectional optical module 100 according to the present embodiment will be described together with an operation of an OTDR including the bidirectional optical module 100. Here, the configuration of the OTDR is similar to that shown in FIG. 4 and instead of the bidirectional optical module 1, the bidirectional optical module 100 according to the present embodiment is assumed to be applied. In FIG. 1, a broken line indicates an optical path from the light emitting element 110 or 120 to the non-reciprocal unit 150 and a solid line indicates an optical path from the optical fiber 160 to the light receiving element 170.

<Operation of OTDR Including Bidirectional Optical Module>

An OTDR according to the present embodiment first sets the pulse width of pulsed light in advance to the LD drive unit 2 by the signal processing unit 4 of the OTDR. Next, the OTDR transmits a timing signal to the LD drive unit 2 at predetermined intervals by a timing generation unit (not shown) inside the signal processing unit 4. After receiving the timing signal, the LD drive unit 2 causes the light emitting element 110 or 120 of the bidirectional optical module 100 to emit pulsed light in synchronization with the received timing signal.

A pulsed light of the wavelength $\lambda_1$ emitted from the light emitting element 110 is made parallel by the lens 131 and refracted by the refractive prism 141. Then, after passing through the refractive prism 141, the light enters the non-reciprocal unit 150 at a predetermined angle θ as linearly polarized light having the polarization plane horizontal to the incidence plane when entering the non-reciprocal unit 150. On the other hand, a pulsed light of the wavelength $\lambda_2$ emitted from the light emitting element 120 is made parallel by the lens 132 and refracted by the refractive prism 142. Then, after passing through the refractive prism 142, the light enters the non-reciprocal unit 150 at a predetermined angle −θ as linearly polarized light having the polarization plane perpendicular to the incidence plane when entering the non-reciprocal unit 150. The wavelength $\lambda_1$ of light emitted from the light emitting element 110 can be set, for example, at about 1310 nm and the wavelength $\lambda_2$ of light emitted from the light emitting element 120 can be set, for example, at about 1550 nm.

Figure 2B:
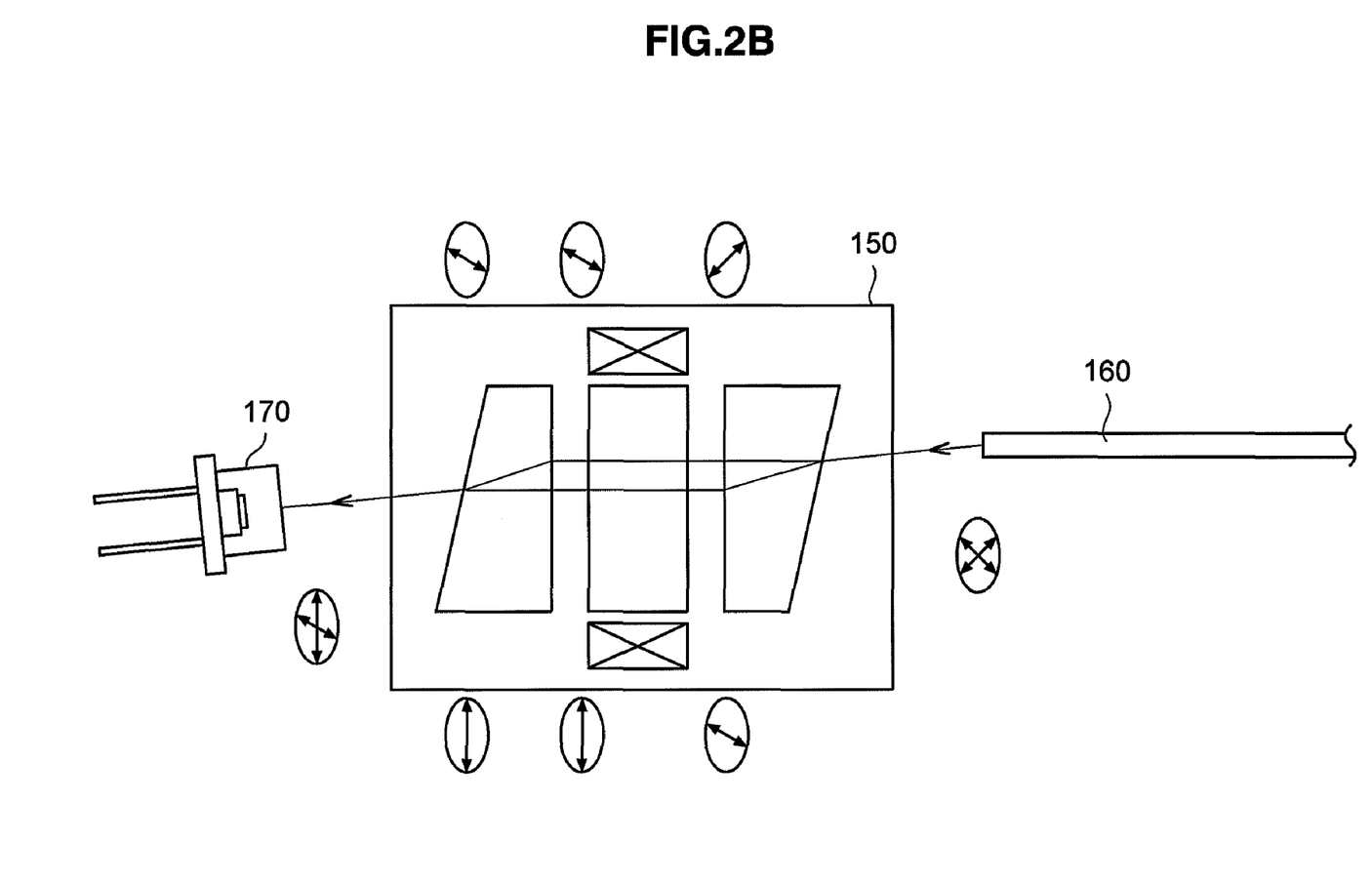
FIG. 2B is an explanatory diagram showing the configuration of the non-reciprocal unit according to the first embodiment and the optical path from the optical fiber to the light emitting element.

After entering the non-reciprocal unit 150, as shown in FIG. 2A, the lights of the wavelengths $\lambda_1$ and $\lambda_2$ orthogonal to each other travel through the double refraction optical elements 151 and 152 and the Faraday rotator 153. After entering the double refraction optical element 151 at the predetermined angle θ, the linearly polarized light of the wavelength $\lambda_1$ emitted from the light emitting element 110 is refracted at the reflecting surface of the double refraction optical element 151 and then travels through the double refraction optical element 151, the Faraday rotator 153, and the double refraction optical element 152 substantially in parallel to the optical axis AX. At this point, the polarization plane of the light is rotated by a predetermined angle, for example, by about 45° by passing through the Faraday rotator 153. In FIG. 2A and FIG. 2B, an arrow inside an elliptical shape indicates the direction of a polarization plane.

On the other hand, after entering the double refraction optical element 151 at the predetermined angle −θ, the linearly polarized light of the wavelength $\lambda_2$ emitted from the light emitting element 120 is refracted at the reflecting surface of the double refraction optical element 151 and then travels through the double refraction optical element 151. The linearly polarized light of the wavelength $\lambda_2$ emitted from the double refraction optical element 151 travels through the Faraday rotator 153 substantially in parallel to the optical axis AX and then, is refracted at the reflecting surface of the double refraction optical element 152 before traveling through the double refraction optical element 152. At this point, the polarization plane of the light is rotated by a predetermined angle, for example, by about 45° by passing through the Faraday rotator 153.

The linearly polarized light of the wavelength $\lambda_1$ and the linearly polarized light of the wavelength $\lambda_2$ are multiplexed at the emission plane of the double refraction optical element 152 before being coupled to an end face of the optical fiber 160 by the lens 133. After entering the optical fiber 160, the light is input into the measurement target optical fiber 7 via the measurement connector 6. In this manner, lights emitted from the first port P1 and the second port P2 enter the third port P3. Then, if the light is reflected by a fracture (or a connecting point) inside the measurement target optical fiber 7, a returning light from the measurement target optical fiber 7 enters the non-reciprocal unit 150 again via the measurement connector 6 and the lens 133.

After entering the non-reciprocal unit 150, as shown in FIG. 2B, the returning light travels through the double refraction optical elements 151 and 152 and the Faraday rotator 153. That is, after entering the double refraction optical element 152, the returning light is separated into a linearly polarized light s wave having the polarization plane perpendicular to the incidence plane when entering the non-reciprocal unit 150 and a linearly polarized light p wave having the polarization plane horizontal to the incidence plane.

After being refracted at the reflecting surface of the double refraction optical element 152, the linearly polarized light s wave travels through the double refraction optical element 152 and the Faraday rotator 153 substantially in parallel to the optical axis AX. Then, after being refracted at the reflecting surface of the double refraction optical element 151, the linearly polarized light s wave travels through the double refraction optical element 151. On the other hand, after being refracted at the reflecting surface of the double refraction optical element 152, the linearly polarized light p wave travels through the double refraction optical element 152. Then, the linearly polarized light p wave travels through the Faraday rotator 153 and the double refraction optical element 151 substantially in parallel to the optical axis AX. Here, the polarization plane of light of the s wave and p wave is further rotated by a predetermined angle, for example, by about 45° by passing through the Faraday rotator 153.

Then, the s wave and p wave of the returning light are multiplexed at the emission plane of the double refraction optical element 151 before being coupled to the light receiving surface of the light receiving element 170 by the lens 134. Here, the separation width of two polarized waves in the double refraction optical element 152 is only slight. Therefore, the two polarized waves can be coupled by causing almost no loss. That is, the non-reciprocal unit 150 according to the present embodiment has polarization independence that when light travels from the third port P3 to the fourth port P4, the light can be coupled regardless of the polarization state.

While FIG. 1 shows that the optical path of light on the incidence side and emission side of the non-reciprocal unit 150 is the same as the optical axis AX, an actual optical path of light is slightly shifted, as shown in FIG. 2A and FIG. 2B, from the optical axis AX on the incidence side and emission side of the non-reciprocal unit 150. However, in the present embodiment, the coupling loss from the first port P1 to the third port P3 and from the second P2 to the third port P3 is about 3.0 dB or less and the coupling loss from the third port P3 to the fourth port P4 is about 1.0 dB or less. Thus, these values are regarded as a very small amount and FIG. 1 is shown with zero coupling loss.

After receiving the returning light from the light receiving element 170, the sampling part 3 converts an electric signal (photoelectric current) from the light receiving element 170 of the bidirectional optical module 100 into a voltage for sampling. Then, operation processing is performed on an electric signal as a sampling result by the signal processing part 4 and a result of the operation processing is displayed by the display unit 5.

In the foregoing, the configuration of the bidirectional optical module 100 according to the present embodiment and the operation of an OTDR using the bidirectional optical module 100 have been described. The bidirectional optical module 100 described above can load light of a plurality of wavelengths by using one non-reciprocal unit 150 having non-reciprocity. Accordingly, costs can be reduced by reducing the number of components. Moreover, by using the non-reciprocal unit 150, which is a non-reciprocal unit having the circulator function, an effect of being able to control the coupling loss of light to an extremely low level is achieved. Further, the need for troublesome work such as fusing work of optical fiber and accommodation of remaining-length optical fiber necessary in the past can be eliminated so that costs in the manufacturing process can be reduced. Also, multiplexing/demultiplexing couplers used in the past become unnecessary so that miniaturization of equipment can be realized.

Second Embodiment

Figure 3:
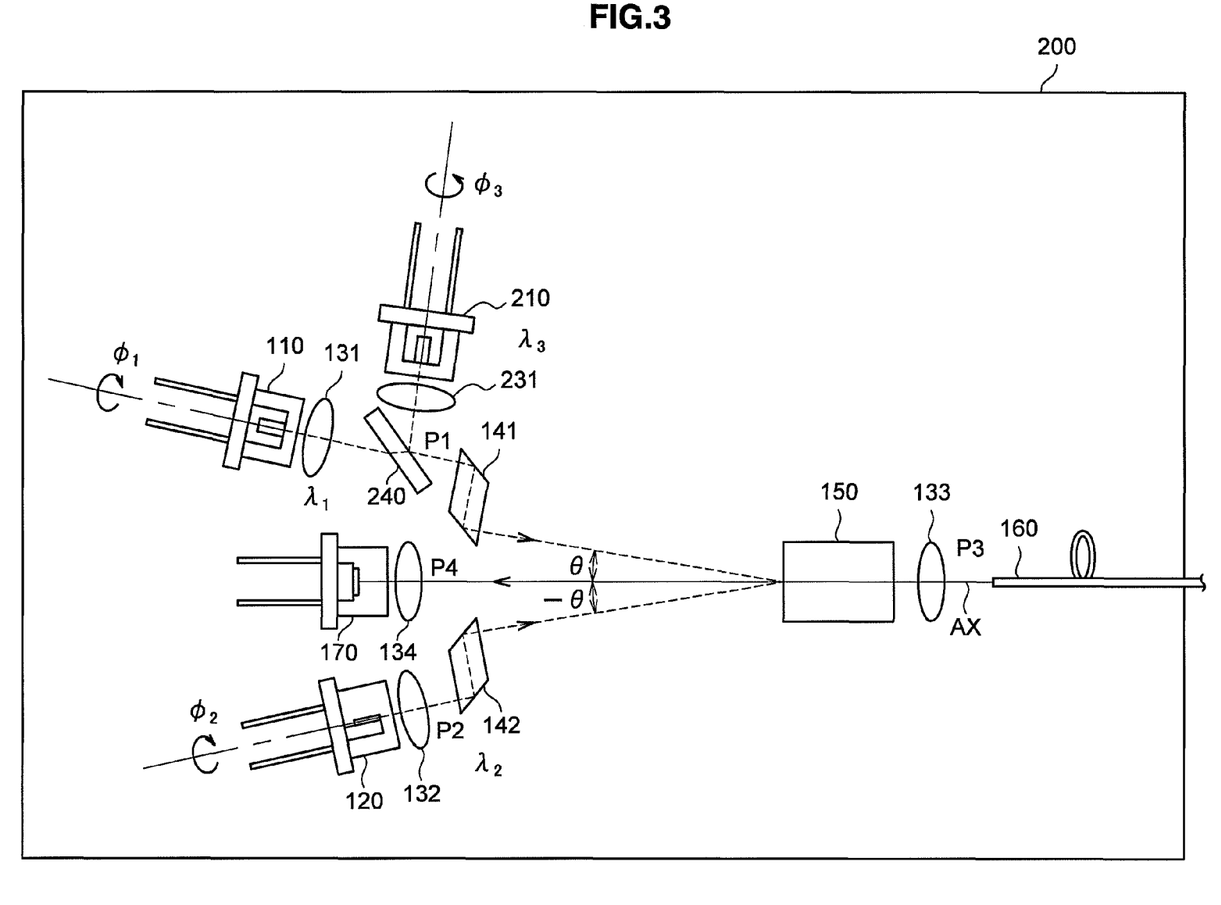
FIG. 3 is an explanatory diagram showing the configuration of a bidirectional optical module according to a second embodiment of the present invention.

Next, a bidirectional optical module 200 according to the second embodiment of the present embodiment will be described based on FIG. 3. FIG. 3 is an explanatory diagram showing the configuration of the bidirectional optical module 200 according to the present embodiment. The bidirectional optical module 200 according to the present embodiment is different, when compared with the first embodiment, in that the bidirectional optical module is provided for three wavelengths by adding a light emitting element 210. A difference from the first embodiment will mainly be described below and a detailed description of the same constitution and the same operation is omitted.

<Configuration of Bidirectional Optical Module>

The bidirectional optical module 200 according to the present embodiment includes, as shown in FIG. 3, the light emitting elements 110, 120, and 210 to emit light, the lenses 131 and 132 and a lens 231 to make light parallel, the lenses 133 and 134 to condense light, a multiplexing/demultiplexing filter 240, the refractive prisms 141 and 142, the non-reciprocal unit 150 to allow light to pass only in one direction, the optical fiber 160, and the light receiving element 170 to detect light. The bidirectional optical module 200 according to the present embodiment has the light emitting element 110 and the light emitting element 210 disposed in the first port P1, the light emitting element 120 disposed in the second port P2, the optical fiber 160 disposed in the third port P3, and the light receiving element 170 disposed in the fourth port P4. In the bidirectional optical module 200 described above, light emitted from the first port P1 or second port P2 is emitted from the third port P3 via the non-reciprocal unit 150. Returning light entering from the third port P3 is emitted from the fourth port P4 via the non-reciprocal unit 150.

The light emitting element 210 is a element that emits light to enter the optical fiber 160 and, similar to the light emitting element 110 and 120, for example, a laser diode can be used. The light emitting element 210 is inserted into the cabinet or the like of the bidirectional optical module 200 after the direction of the polarization plane of linearly polarized waves of emitted light from the light emitting element 210 being rotated by a predetermined rotation angle $\phi_3$. In the present embodiment, similar to the light emitting element 110, the light emitting element 210 is provided so that linearly polarized light having the polarization plane perpendicular to the incidence plane when entering the non-reciprocal unit 150, that is, an s wave is emitted. The light emitting element 210 emits light of the wavelength $\lambda_3$ (for example, about 1490 nm).

The lens 231 is a lens to make light parallel and, for example, a collimator lens can be used. The lens 231 makes light emitted from the light emitting element 210 parallel.

The multiplexing/demultiplexing filter 240 is a filter to multiplex/demultiplex light and, for example, a dielectric multilayer filter can be used. The multiplexing/demultiplexing filter 240 allows light entering from the light emitting element 110 to pass and causes light entering from the light emitting element 210 to reflect and thus, has properties to allow light of the wavelength $\lambda_1$ to pass and to cause light of the wavelength $\lambda_3$ to reflect. The multiplexing/demultiplexing filter 240 is disposed in such a way that light incident from the light emitting element 110 and light incident from the light emitting element 210 are led to the refractive prism 141.

<Operation of OTDR Including Bidirectional Optical Module>

Next, the operation of the bidirectional optical module 200 according to the present embodiment will be described. Similar to the first embodiment, the bidirectional optical module 200 can use, for example, an OTDR shown in FIG. 4. The light emitting elements 110, 120, and 210 of the bidirectional optical module 200 are drive-controlled by the LD drive unit 2 to output pulsed light. Pulsed light of the wavelength $\lambda_1$ emitted from the light emitting element 110 is made parallel by the lens 131 before entering the multiplexing/demultiplexing filter 240. Pulsed light of the wavelength $\lambda_3$ emitted from the light emitting element 210 is made parallel by the lens 231 before entering the multiplexing/demultiplexing filter 240.

At this point, the multiplexing/demultiplexing filter 240 allows light of the wavelength $\lambda_1$ to pass and causes light of the wavelength $\lambda_3$ to reflect and thus, lights of the two wavelengths are coupled at the reflecting surface of the light of the wavelength $\lambda_3$ of the multiplexing/demultiplexing filter 240. The light emitting elements 110 and 210 are placed in advance so that the polarization plane of light emitted from the light emitting element 110 and that of light emitted from the light emitting element 210 are in the same direction. Coupled light enters the refractive prism 141 to travel through the refractive prism 141. After passing through the refractive prism 141, the light enters the non-reciprocal unit 150 at the predetermined angle θ as linearly polarized light (s wave) having the polarization plane perpendicular to the incidence plane when entering the non-reciprocal unit 150.

On the other hand, pulsed light of the wavelength $\lambda_2$ emitted from the light emitting element 120 is made parallel by the lens 132 and refracted by the refractive prism 142. Then, after passing through the refractive prism 142, the light enters the non-reciprocal unit 150 at the predetermined angle −θ as linearly polarized light (p wave) having the polarization plane horizontal to the incidence plane when entering the non-reciprocal unit 150.

After entering the non-reciprocal unit 150, similar to the first embodiment, as shown in FIG. 2A, linearly polarized light of the wavelengths $\lambda_1$ and $\lambda_3$ and linearly polarized light of the wavelength $\lambda_2$ orthogonal thereto travel through the double refraction optical elements 151 and 152 and the Faraday rotator 153. The linearly polarized light of the wavelengths $\lambda_1$ and $\lambda_3$ and linearly polarized light of the wavelength $\lambda_2$ are multiplexed at the emission plane of the double refraction optical element 152 before being coupled to the end face of the optical fiber 160 of the lens 133. After entering the optical fiber 160, the light is input into the measurement target optical fiber 7 via the measurement connector 6. In this manner, lights emitted from the first port P1 and the second port P2 enter the third port P3. Then, if the light is reflected by a fracture (or a connecting point) inside the measurement target optical fiber 7, a returning light from the measurement target optical fiber 7 enters the non-reciprocal unit 150 again via the measurement connector 6 and the lens 133.

After entering the non-reciprocal unit 150, similar to the first embodiment, as shown in FIG. 2B, the returning light travels through the double refraction optical elements 151 and 152 and the Faraday rotator 153. That is, after entering the double refraction optical element 152, the returning light is separated into a linearly polarized light s wave having the polarization plane perpendicular to the incidence plane when entering the non-reciprocal unit 150 and a linearly polarized light p wave having the polarization plane horizontal to the incidence plane to travel through the non-reciprocal unit 150. Then, the s wave and p wave of the returning light are multiplexed at the emission plane of the double refraction optical element 151 before being coupled to the light receiving surface of the light receiving element 170 by the lens 134.

By using the multiplexing/demultiplexing filter 240, as described above, light of three wavelengths can be multiplexed/demultiplexed by the non-reciprocal unit 150. Therefore, the need for a multiplexing/demultiplexing coupler that becomes more complex and expensive with the support of multi wavelengths is eliminated so that miniaturization and cost reduction of equipment can be realized.

By configuring a bidirectional optical module in the same manner as the bidirectional optical module 200 according to the present embodiment, the bidirectional optical module can be configured to support four wavelengths or more. Here, the Faraday rotator 153 of the non-reciprocal unit 150 is a element having wavelength dependence. Thus, regarding the Faraday rotator, it is desirable to design a Faraday rotator in accordance with usage such as using the Faraday rotator 153 of a wavelength band that corresponds to an intermediate wavelength of wavelengths of light incident on the Faraday rotator 153 or using the Faraday rotator 153 of a wavelength band near a specific wavelength at which losses should be reduced.

Further, as a similar configuration of the bidirectional optical module 200 according to the present embodiment, optical power of each wavelength can approximately be doubled by making the wavelength of light emitted from the first port P1 and wavelength of light emitted from the second port P2 equal and emitting light simultaneously. For example, a case in which lights emitted from two light emitting elements are emitted from each of the first port P1 and the second port P2 is considered. Wavelengths of lights emitted from one port are different. It is also assumed in this example that it is the same light emitting element that emits light of the same wavelength.

In this case, first, lights of the wavelength $\lambda_1$ and the wavelength $\lambda_2$ are emitted from the first port P1 and multiplexed by a multiplexing/demultiplexing filter before being incident on a non-reciprocal unit via a refractive prism. On the other hand, lights of the wavelength $\lambda_1$ and the wavelength $\lambda_2$ are similarly emitted from the second port P2 and multiplexed by a multiplexing/demultiplexing filter before being incident on the non-reciprocal unit via a refractive prism. At this time, two light emitting elements emitting lights emitted from the first port P1 and two light emitting elements emitting lights emitted from the second port P2 are caused to emit simultaneously. Accordingly, optical power of the wavelength $\lambda_1$ and that of the wavelength $\lambda_2$ can approximately be doubled compared when light is emitted from one light emitting element.

It should be understood by those skilled in the art that various modifications, combinations, sub-combinations and alterations may occur depending on design requirements and other factors insofar as they are within the scope of the appended claims or the equivalents thereof.

What is claimed is:

1. A bidirectional optical module that emits light to an optical fiber and on which returning light from the optical fiber is incident, comprising:
   a plurality of light emitting elements that emit light to enter the optical fiber;
   a light receiving element that receives light having exited the optical fiber; and
   a non-reciprocal unit for making an optical path in a forward direction from the light emitting element to the optical fiber and an optical path in a backward direction from the optical fiber to the light emitting element different,
   wherein polarization planes of light incident on the optical fiber after being emitted from the plurality of light emitting elements are mutually orthogonal, and the non-reciprocal unit emits returning light of the light emitted from the plurality of light emitting elements from the optical fiber toward the light receiving element to one light receiving element,
   wherein the light emitted from the plurality of light emitting elements is emitted from a first port or a second port,
   wherein the light emitted from the first port is incident on the non-reciprocal unit with an inclination at an angle in a positive direction greater than zero with respect to an optical axis of the non-reciprocal unit, and
   wherein the light emitted from the second port is incident on the non-reciprocal unit with an inclination at an angle in a negative direction greater than zero with respect to the optical axis of the non-reciprocal unit.

2. The bidirectional optical module according to claim 1, wherein the polarization plane of light emitted from the first port and the polarization plane of light emitted from the second port are orthogonal to each other.

3. The bidirectional optical module according to claim 1, wherein light emitted from the first port is emitted from at least the two light emitting elements and directions of the polarization planes of light emitted from at least the two light emitting elements are identical.

4. The bidirectional optical module according to claim 1, wherein the non-reciprocal unit includes a Faraday rotator and wedge-shaped double refraction optical elements placed reversed on both sides of the Faraday rotator.

5. The bidirectional optical module according to claim 1, comprising a refraction optical element for refracting the optical path between the light emitting element and the non-reciprocal unit.

6. The bidirectional optical module according to claim 5, comprising a multiplexing/demultiplexing filter for multiplexing lights emitted from the plurality of light emitting elements between the light emitting elements and the double refraction optical elements.

7. An optical time domain reflectometer that tests loss characteristics of an optical fiber, comprising:
   a bidirectional optical module that emits light toward the optical fiber and receives light returning from the optical fiber;
   a bidirectional optical module drive unit that drives the bidirectional optical module so as to emit light with predetermined timing;
   an electrical signal conversion unit that converts light having entered the bidirectional optical module to an electrical signal; and
   a signal processing unit that determines through calculation the loss characteristics of the optical fiber based on the electrical signal resulting from the conversion executed by the electrical signal conversion unit, wherein
   the bidirectional optical module includes:
   a plurality of light emitting elements that emit light to enter the optical fiber;
   a light receiving element that receives light having exited the optical fiber; and
   a non-reciprocal unit for making an optical path in a forward direction from the light emitting element to the optical fiber and an optical path in a backward direction from the optical fiber to the light emitting element different,
   wherein polarization planes of light incident on the optical fiber after being emitted from the plurality of light emitting elements are mutually orthogonal, and the non-reciprocal unit emits returning light of the light emitted from the plurality of light emitting elements from the optical fiber toward the light receiving element to one light receiving element,
   wherein the light emitted from the plurality of light emitting elements is emitted from a first port or a second port,
   wherein the light emitted from the first port is incident on the non-reciprocal unit with an inclination at an angle in a positive direction greater than zero with respect to an optical axis of the non-reciprocal unit, and
   wherein the light emitted from the second port is incident on the non-reciprocal unit with an inclination at an angle in a negative direction greater than zero with respect to the optical axis of the non-reciprocal unit.

8. The bidirectional optical module according to claim 1, wherein the axis of the returning light emitted from the non-reciprocal unit is coincident with the optical axis of the non-reciprocal unit.

9. The bidirectional optical module according to claim 1, wherein the inclination angle of the light emitted from the first port which is incident on the non-reciprocal unit and the inclination angle of the light emitted from the second port which is incident on the non-reciprocal unit are symmetrical to the optical axis of the non-reciprocal unit.

10. The optical time domain reflectometer according to claim 7, wherein the axis of the returning light emitted from the non-reciprocal unit is coincident with the optical axis of the non-reciprocal unit.

11. The optical time domain reflectometer according to claim 7, wherein the inclination angle of the light emitted from the first port which is incident on the non-reciprocal unit and the inclination angle of the light emitted from the second port which is incident on the non-reciprocal unit are symmetrical to the optical axis of the non-reciprocal unit.

* * * * *